(12) United States Patent
Tietyen et al.

(10) Patent No.: US 9,599,406 B2
(45) Date of Patent: Mar. 21, 2017

(54) TRANSMISSION HAVING A FLUID COOLING SHROUD

(75) Inventors: Adam L. Tietyen, Mequon, WI (US); Douglas E. Maki, Germantown, WI (US)

(73) Assignee: REXNORD INDUSTRIES, LLC, Milwaukee, WI (US)

(*) Notice: Subject to any disclaimer, the term of this patent is extended or adjusted under 35 U.S.C. 154(b) by 2124 days.

(21) Appl. No.: 12/694,692

(22) Filed: Jan. 27, 2010

(65) Prior Publication Data

US 2011/0179903 A1 Jul. 28, 2011

(51) Int. Cl.
| | |
|---|---|
| F28D 1/03 | (2006.01) |
| F28D 1/02 | (2006.01) |
| F28F 3/12 | (2006.01) |
| F16H 57/04 | (2010.01) |
| F28D 21/00 | (2006.01) |

(52) U.S. Cl.
CPC .......... *F28D 1/0383* (2013.01); *F28D 1/024* (2013.01); *F28F 3/12* (2013.01); *F16H 57/0416* (2013.01); *F28D 2021/0049* (2013.01); *Y10T 74/2189* (2015.01)

(58) Field of Classification Search
USPC .................. 74/606 A; 165/120–122, 72–75; 184/6.12, 1.5
IPC ....................................................... F16H 57/04
See application file for complete search history.

(56) References Cited

U.S. PATENT DOCUMENTS

| | | | |
|---|---|---|---|
| 2,063,646 A | * | 12/1936 | Whitesel ........................ 165/122 |
| 2,147,391 A | * | 2/1939 | Acker ........................ 74/606 A |
| 2,548,805 A | | 8/1946 | Moir et al. |
| 2,469,259 A | * | 5/1949 | Burgess ........................ 165/122 |
| 2,646,258 A | * | 7/1953 | Freer ............................ 165/121 |

(Continued)

FOREIGN PATENT DOCUMENTS

| | | |
|---|---|---|
| GB | 120184 | 10/1918 |
| GB | 1109801 | 4/1968 |

(Continued)

OTHER PUBLICATIONS

PCT International Search Report and Written Opinion, Application No. PCT/US2011/022222, Apr. 1, 2011.

(Continued)

*Primary Examiner* — Daniel Yabut
(74) *Attorney, Agent, or Firm* — Quarles & Brady LLP (57) ABSTRACT

A transmission having improved heat dissipation components is disclosed. The transmission includes a housing having housing walls defining an internal chamber and a rotatable input shaft extending through one of the housing walls into the internal chamber. Power transmission components are disposed in the internal chamber and rotatably driven by the input shaft. An output shaft extends through one of the housing walls from the internal chamber and is rotatably driven by the power transmission components. A lubricating fluid is disposed in the internal chamber and lubricates the power transmission components. A cooling shroud surrounds the housing and includes a cooling passageway in fluid communication with the internal chamber. The lubricating fluid flows out of the internal chamber into the cooling passageway, through the cooling passageway, and back into the internal chamber.

16 Claims, 6 Drawing Sheets

(56) References Cited

U.S. PATENT DOCUMENTS

| | | | |
|---|---|---|---|
| 3,353,591 A * | 11/1967 | Samoilovich | 74/606 A |
| 3,891,059 A | 6/1975 | Jones | |
| 4,074,590 A | 2/1978 | Jorg | |
| 4,872,502 A | 10/1989 | Holzman | |
| 5,107,718 A | 4/1992 | Inagawa | |
| 5,678,461 A * | 10/1997 | Stine | 74/606 A |
| 6,155,135 A | 12/2000 | Gage et al. | |
| 6,997,238 B1 | 2/2006 | Ruthy et al. | |

FOREIGN PATENT DOCUMENTS

| | | |
|---|---|---|
| JP | 56060848 | 5/1981 |
| JP | 60089453 | 6/1985 |
| JP | H0576845 | 10/1993 |
| JP | H08105521 A | 4/1996 |
| JP | 2006088982 | 4/2006 |
| WO | WO8806678 A1 | 9/1988 |

OTHER PUBLICATIONS

Japan Patent Office, Notification of Reason for Refusal, Application No. 2012-551214, Oct. 7, 2014, 11 pages.

* cited by examiner

TRANSMISSION HAVING A FLUID COOLING SHROUD

CROSS-REFERENCE TO RELATED APPLICATION

Not Applicable.

STATEMENT CONCERNING FEDERALLY SPONSORED RESEARCH OR DEVELOPMENT

Not Applicable.

BACKGROUND OF THE INVENTION

This invention relates to transmissions having external fluid coolers.

Transmissions such as industrial gear drives are capable of transmitting a large amount of mechanical power. Unfortunately, some of the transmitted power is converted to heat that may increase the transmission temperature to an unacceptably high level. Such temperatures may cause lubricating fluid within the transmission housing to deteriorate rapidly and ultimately lead to component wear or failure.

As such, many transmissions include heat dissipation components to prevent overheating. For example, some transmissions simply include a fan to provide convective cooling by blowing air over the external surfaces of the transmission housing. However, these heat dissipation systems, despite being structurally simple and relatively inexpensive, are typically ineffective for significantly decreasing the transmission temperature unless they are much larger than the transmission itself.

As another example, some transmissions include external radiators or heat pipes having internal chambers to accommodate the lubricating fluid and permit cooling outside of the transmission housing. Like the fan systems described above, relatively large radiators, e.g., those having a relatively large surface, are most effective for cooling a transmission. As such, the most effective heat dissipation components can significantly increase the space required for a transmission.

Considering the drawbacks of previous designs, a transmission having improved heat dissipation components is needed.

SUMMARY OF THE INVENTION

In one aspect, the present invention provides a transmission including a housing having housing walls defining an internal chamber and a rotatable input shaft extending through one of the housing walls into the internal chamber. Power transmission components are disposed in the internal chamber and rotatably driven by the input shaft. An output shaft extends through one of the housing walls from the internal chamber and is rotatably driven by the power transmission components. A lubricating fluid is disposed in the internal chamber and lubricates the power transmission components. A cooling shroud surrounds the housing and defines a gap between at least one of the housing walls. The cooling shroud includes a cooling passageway in fluid communication with the internal chamber. The lubricating fluid flows out of the internal chamber into the cooling passageway, through the cooling passageway, and back into the internal chamber. The transmission further includes a fan exhausting air through the gap cooling the at least one of the housing walls and the lubricating fluid flowing through the cooling passageway.

In some embodiments, the cooling shroud includes fan shroud surrounding the fan and a housing shroud surrounding the housing.

The foregoing and advantages of the invention will appear in the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and:

FIG. 4 is a "flattened" schematic view of a housing shroud showing a fluid flow path there through;

DETAILED DESCRIPTION OF THE INVENTION

The particulars shown herein are by way of example and only for purposes of illustrative discussion of the embodiments of the invention. The particulars shown herein are presented to provide what is believed to be the most useful and readily understood description of the principles and conceptual aspects of the invention. In this regard, no attempt is made to show structural details of the invention in more detail than is necessary for the fundamental understanding of the invention. The description taken with the drawings should make apparent to those skilled in the art how the several forms of the present invention may be embodied in practice.

Figure 1:
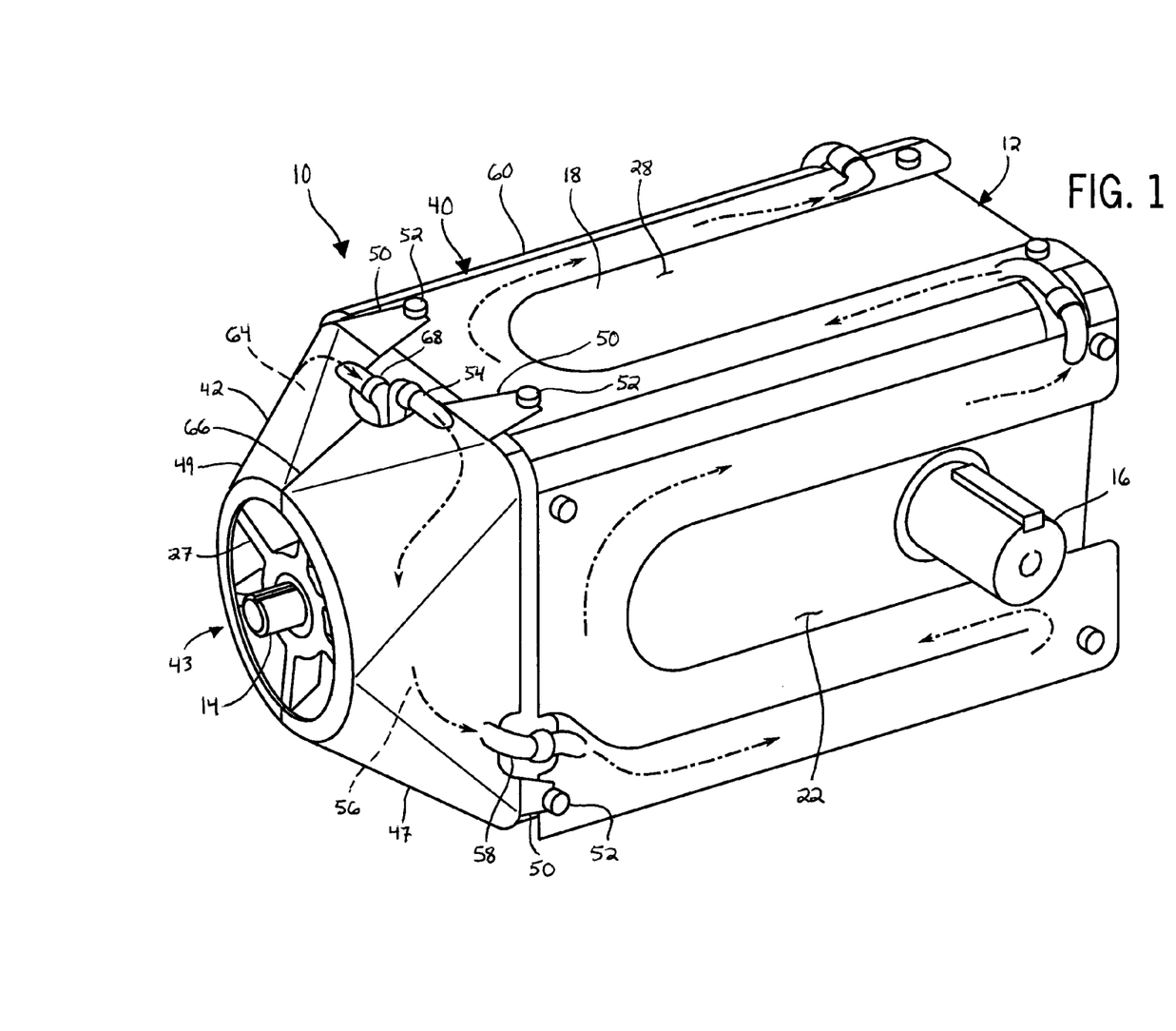
FIG. 1 is a perspective view of a transmission including a cooling shroud according to the present invention.
Figure 2:
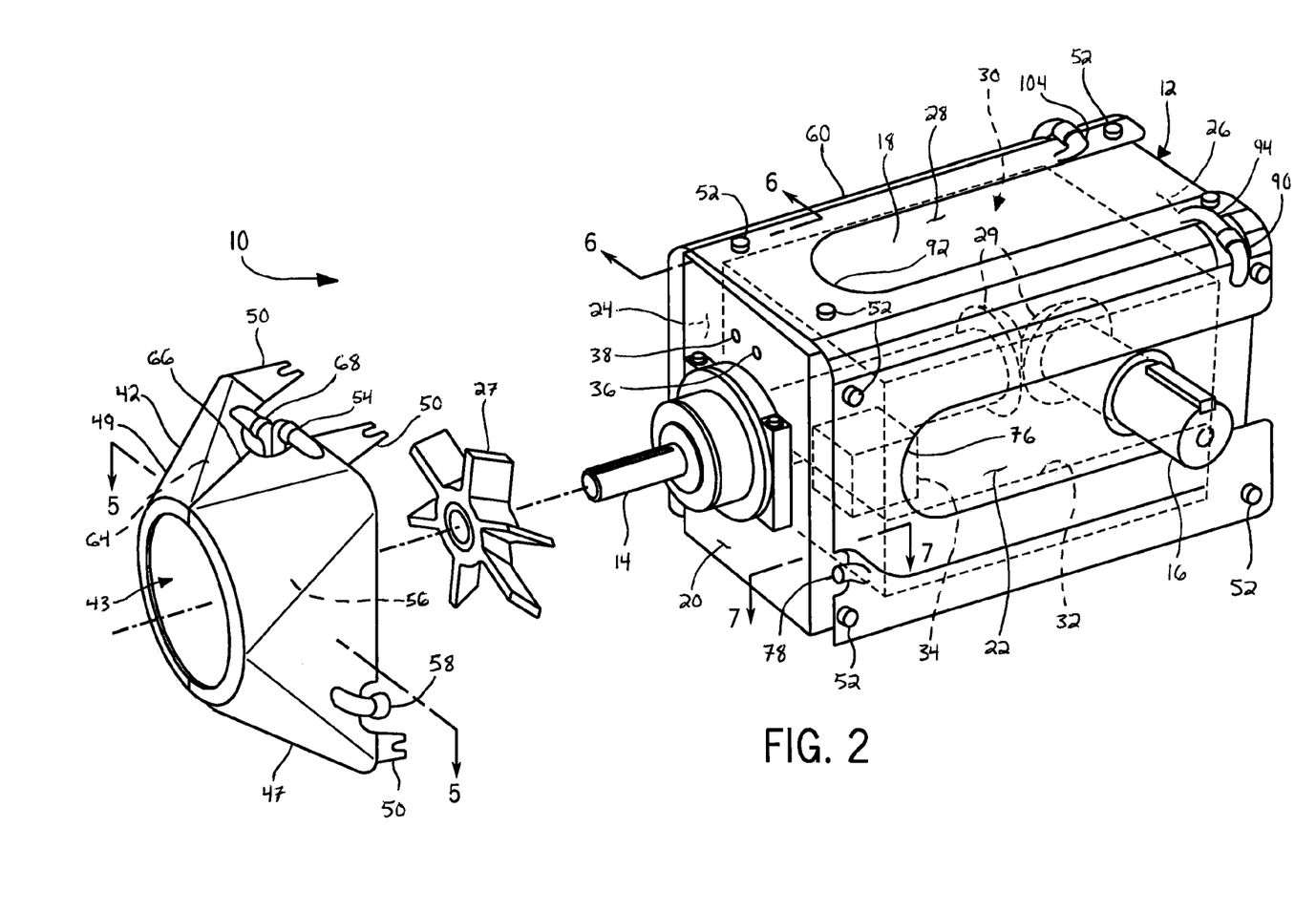
FIG. 2 is an exploded perspective view showing a fan of the transmission of FIG. 1.
Figure 3:
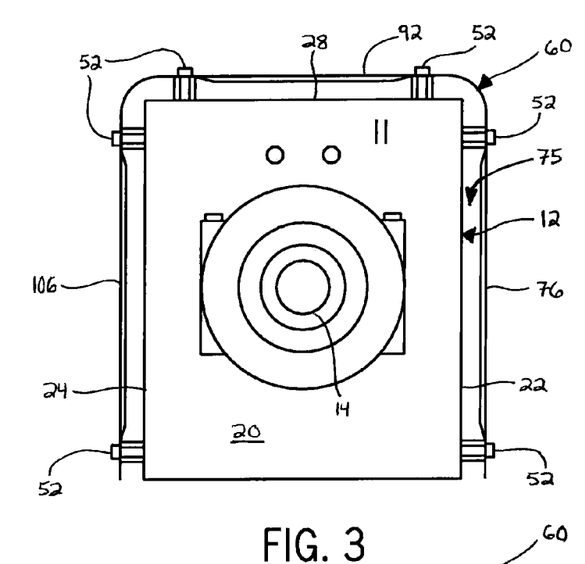
FIG. 3 is a front view of the transmission of FIG. 1 with the fan and a fan shroud removed.

Referring to FIGS. 1-2, a transmission 10 according to the present invention includes a housing 12 that rotatably supports an input shaft 14 and an output shaft 16 driven by the input shaft 14. The housing 12 includes a housing walls 18 having a front surface 20 and right side surface 22 from which the input shaft 14 and the output shaft 16 extend, respectively. As such, the transmission 10 is a right angle shaft transmission. The output shaft 16 may also extend from a left side surface 24 of the housing 12. Furthermore, the output shaft 16 may extend from a surface opposite the front surface 20, i.e., a rear surface 26 of the housing 12, to provide a parallel shaft transmission without departing from the scope of the invention. The housing walls 18 also include an upper surface 28 having a removable inspection cover (not shown). The upper surface 28 is adjacent the front surface 20, the right side surface 22, the left side surface 24, and the rear surface 26. As used herein, the term "adjacent" means that two surfaces share a common edge. In contrast and as used herein, the term "opposite" means that two surfaces do not share a common edge.

The input shaft 14 supports a fan 27 that draws air towards the transmission housing 12 as in the input shaft 14 rotates. The fan 27 can also be driven by the output shaft 16 or can be completely independent of the shafts 14 and 16 without departing from the scope of the invention. Regardless of the specific structure, the fan 27 exhausts air along the housing walls 18 to cool the housing 12 and thereby prevent the transmission 10 from overheating. Other components that further dissipate heat from the transmission 10 are described in further detail below.

As shown most clearly in FIG. 2, the housing walls 18 define an internal chamber 30 in which power transmission components 29 are disposed. The power transmission components 29 may be, e.g., bevel gears and helical gears. However, other types of gears, e.g., spur gears, worm gears, planetary gears, helical gears, combinations thereof, or even other types of power transmission components may be used without departing from the scope of the invention. In any case, the power transmission components provide the driving relationship between the input shaft 14 and the output shaft 16.

The internal chamber 30 of the housing 12 also accommodates a lubricating fluid 32 that reduces transmission wear by absorbing heat generated by the transmission components. As such, the internal chamber 30 also preferably accommodates a pump 34 that delivers lubricating fluid 32 to a housing output port 36 for subsequent cooling. However, the lubricating fluid 32 may be directed to the output port 36 by other means, e.g., gravity, without departing from the scope of the invention. In any case, after cooling the lubricating fluid 32 returns to the internal chamber 30 through a housing input port 38.

Referring now to FIGS. 1-7, the transmission housing 12 supports a radiator jacket or cooling shroud 40 having a cooling circuit or passageway through which the lubricating fluid 32 flows to cool. The shape of the cooling shroud 40 advantageously closely matches the external shape of the transmission housing 12, and therefore the cooling shroud 40 does not significantly increase the space required for the transmission 10. That is, the cooling shroud 40 includes a fan shroud 42 that surrounds the input shaft 14 and the fan 27 and a housing shroud 60 that surrounds the housing 12. The fan shroud 42 and the housing shroud 60 are described in further detail in the following paragraphs, but it should be noted that as used herein, the term "surround" and variations thereof means a shroud is disposed proximate at least two opposite surfaces of another object.

The fan shroud 42 has a general open-bowl shape through which air is drawn by the fan 27 and directed towards the housing walls 18. That is, air is drawn through an air input 43 and directed towards an air output 45 proximate the front surface 20 of the housing 12. The air input 43 and the air output 45 are separated by diagonally extending walls that provide the open-bowl shape of the fan shroud 42. The open-bowl shape of the fan shroud 42 is also formed by a right half 47 and a left half 49 that together surround the input shaft 14 and the fan 27. The halves 47 and 49 may connect to each other by fasteners, or as shown in the figures, by diagonally extending weld lines 66.

Figure 5:
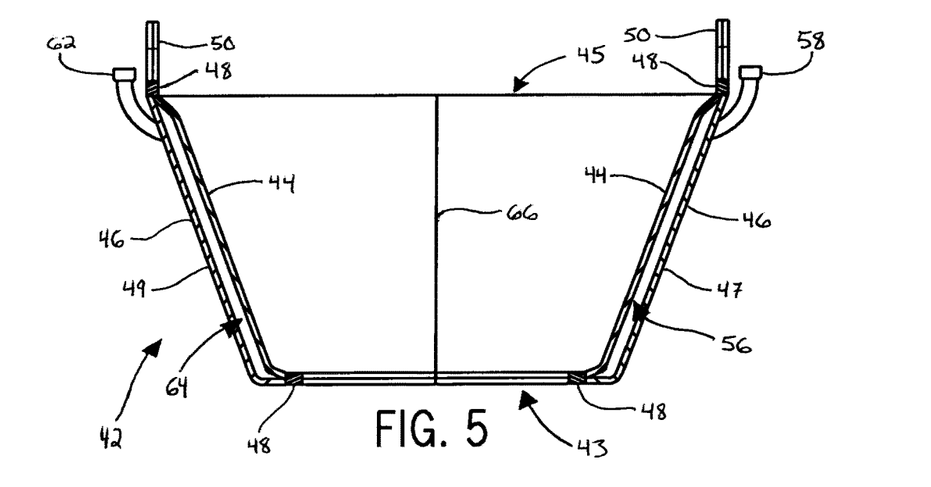
FIG. 5 is a top sectional view of the fan shroud along line 5-5 of FIG. 2.
Figure 6:
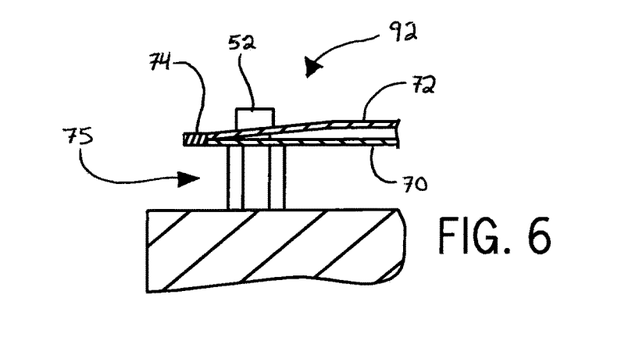
FIG. 6 is a detail section view of the transmission along line 6-6 of FIG. 2.
Figure 7:
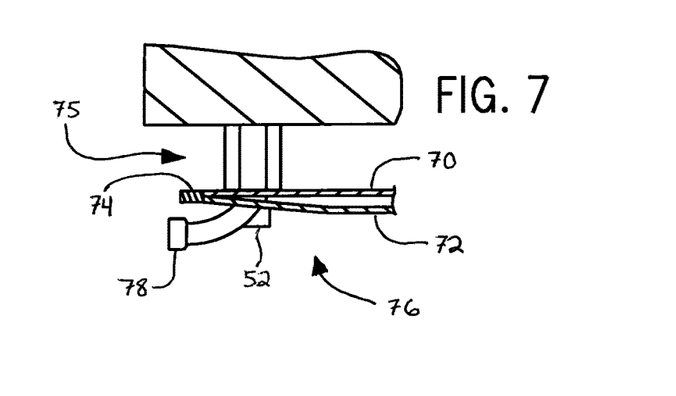
FIG. 7 is a detail section view of the transmission along line 7-7 of FIG. 2.

As shown most clearly in FIG. 5, the walls of the halves 47 and 49 are defined by an inner layer 44 and an outer layer 46 that are preferably shaped sections of sheet metal, although other materials may be used without departing from the scope of the invention. In any case, the inner layer 44 and the outer layer 46 are spaced apart to define the cooling passageway there between. Of course, the edges of the inner layer 44 and an outer layer 46 are sealed, e.g., by weld lines 48, to prevent lubricating fluid 32 leaks.

The right and left halves 47 and 49 of the fan shroud 42 each define separate sections of the cooling passageway through which the lubricating fluid 32 passes. For example, lubricating fluid 32 enters the right half 47 through a shroud input port 54 disposed near the upper surface 28 of the transmission housing 12 and connected to the housing output port 36. The shroud input port 54 delivers lubricating fluid 32 to an input passage 56 of the cooling passageway defined between the inner and outer layers 44 and 46 of the right half 47. The input passage 56 delivers lubricating fluid 32 to a fan shroud output port 58 disposed near the bottom corner of the front surface 20 and the right side surface 22 of the transmission housing 12. The fan shroud output port 58 delivers lubricating fluid 32 to the housing shroud 60.

Similarly, lubricating fluid 32 from the housing shroud 60 enters the left half 49 through a fan shroud input port 62 disposed near the bottom corner of the front surface 20 and the left side surface 24 of the transmission housing 12. The fan shroud input port 62 delivers lubricating fluid 32 to an output passage 64 of the cooling passageway defined between the inner and outer layers 44 and 46 of the left half 49. The output passage 64 delivers lubricating fluid 32 to a shroud output port 68 disposed near the upper surface 28 of the transmission housing 12 and connected to the housing input port 38.

The right and left halves 47 and 49 of the fan shroud 42 may connect to the transmission housing 12, the housing shroud 60, or both in various manners. For example, the edges of the fan shroud 42 may be welded to the housing shroud 60. However and as shown in the figures, the outer sheet metal layer 46 preferably forms several mounting feet 50 that accommodate fasteners 52, e.g., bolts and spacers, to connect the fan shroud 42 to the transmission housing 12.

Referring now to FIGS. 2-7 and as briefly described above, the housing shroud 60 receives lubricating fluid 32 from the fan shroud 42 to further dissipate heat from the transmission 10. The housing shroud 60 has a general saddle shape (i.e., the housing shroud 60 is positioned proximate the upper surface 28 and side surfaces 22 and 24 of the housing 12) that extends between the front surface 20 and the rear surface 26 of the transmission housing 12. In addition, the cooling passageway follows a serpentine path over the general saddle shape of the housing shroud 60, and as such the housing shroud 60 has a relatively large surface area over which the lubricating fluid 32 dissipates heat. Furthermore, the housing shroud 60 is spaced apart from the surfaces 22, 24, and 28 of the transmission housing 12 to define a gap 75 there between. Air exhausted by the fan 27 passes through the gap 75 and convectively cools the housing walls 18 and the lubricating oil 32 within the housing shroud 60.

Like the fan shroud 42, the housing shroud 60 is defined by an inner layer 70 and an outer layer 72 (e.g., separate sheet metal layers connected by weld lines 74) that form part of the cooling passageway there between. The inner and outer layers 70 and 72 also form three panels 76, 92, and 106 that provide the serpentine shape of the cooling passageway. As shown in the figures, the panels 76, 92, and 106 are preferably integrally connected to each other (i.e., formed by the same inner and outer layers 70 and 72). However, the panels 76, 92, and 106 may be formed from separate layers without departing from the scope of the invention.

Figure 4:
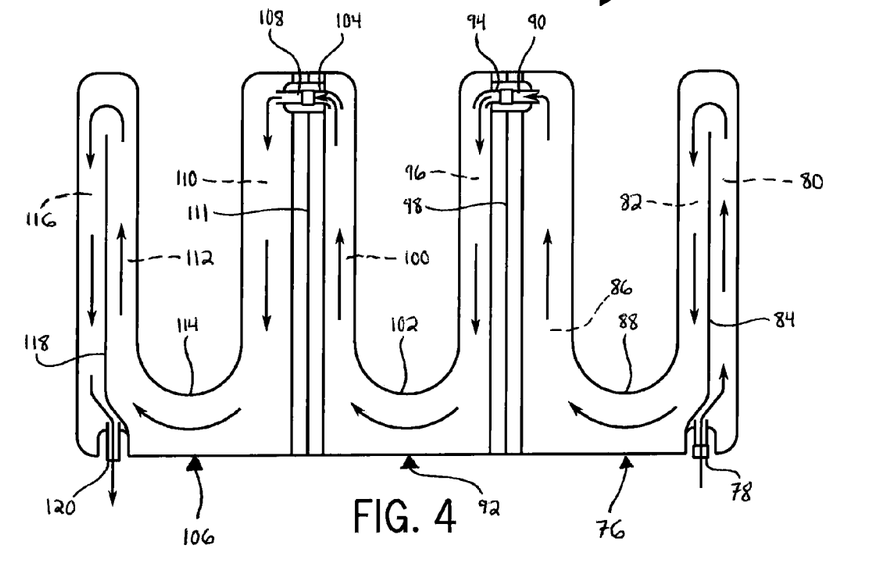

Each of the shroud panels 76, 92, and 106 defines part of the serpentine shape of the cooling passageway that directs lubricating fluid 32 back and forth between the front surface 20 and the rear surface 26 of the housing 12. For example, the first or right side surface shroud panel 76 disposed proximate the right side surface 22 of the housing 12 defines an S-shaped section of the serpentine flow path. This S-shaped section is formed by the following components and features of the first panel 76.

A first or right side surface shroud input port 78 is disposed near the bottom corner of the front surface 20 and the right side surface 22 of the transmission housing 12. The input port 78 receives lubricating fluid 32 from the fan shroud 42 and delivers lubricating fluid 32 to a first leg 80 of the cooling passageway. The first leg 80 connects to a second leg 82 of the cooling passageway near the rear surface 26 of the transmission housing 12. An internal wall, e.g., a weld line 84 connecting the housing shroud inner and outer layers 70 and 72 separates a majority of the first leg 80 and the second leg 82.

The second leg 82 connects to a third leg 86 of the cooling passageway near the front surface 20 of the transmission housing 12. A first shroud opening 88 separates a majority of the second leg 82 and the third leg 86. The output shaft 16 extends through the first shroud opening 88 and, of course, air may escape from the air gap 75 through the first shroud opening 88. The third leg 86 delivers lubricating fluid 32 to a first or right side surface shroud output port 90 disposed near the top corner of the rear surface 26 and the right side surface 22 of the transmission housing 12.

The first panel 76 connects to the second or upper surface shroud panel 92 proximate the upper surface 28 of the housing 12. The second panel 92 defines a U-shaped section of the serpentine flow path. This U-shaped section is formed by the following components and features of the second panel 92.

A second or upper surface shroud input port 94 is disposed near the top corner of the rear surface 26 and the right side surface 22 of the transmission housing 12. The second or upper surface shroud input port 94 connects to the first output port 90 and receives lubricating fluid 32 therefrom. The second port 94 also delivers lubricating fluid 32 to a fourth leg 96 of the cooling passageway. The fourth leg 96 is preferably separated from the third leg 86 of the first panel 76 by an internal wall, e.g., a weld line 98 connecting the housing shroud inner and outer layers 70 and 72.

The fourth leg 96 connects to a fifth leg 100 near the front surface 20 of the transmission housing 12. A second shroud opening 102 separates a majority of the fourth leg 96 and the fifth leg 100. The removable inspection cover may be accessed through the second shroud opening 102 and, of course, air may escape from the air gap 75 through the second shroud opening 102. The fifth leg 100 delivers lubricating fluid 32 to a second or upper surface shroud output port 104 disposed near the top corner of the rear surface 26 and the left side surface 24 of the transmission housing 12.

The second panel 92 connects to a third or left side surface shroud panel 106 proximate the left side surface 24 of the housing 12. The third panel 106 defines an inverted S-shaped section of the serpentine flow path. This inverted S-shaped section is formed by the following components and features of the first panel 106.

A third or left side surface shroud input port 108 is disposed near the top corner of the rear surface 26 and the left side surface 24 of the transmission housing 12. The third input port 108 connects to the second shroud output port 104 and receives lubricating fluid 32 therefrom. The third input port 108 delivers lubricating fluid 32 to a sixth leg 110 of the cooling passageway. The sixth leg 110 is preferably separated from the fifth leg 100 of the second panel 92 by an internal wall, e.g., a weld line 111 connecting the housing shroud inner and outer layers 70 and 72.

The sixth leg 110 connects to a seventh leg 112 of the cooling passageway near the front surface 20 of the transmission housing 12. A third shroud opening 114 separates a majority of the sixth leg 110 and the seventh leg 112. The output shaft 16 may extend through the third shroud opening 114 and, of course, air may escape from the air gap 75 through the third shroud opening 114.

The seventh leg 112 connects to an eighth leg 116 of the cooling passageway near the rear surface 26 of the transmission housing 12. An internal wall, e.g., a weld line 118 connecting the housing shroud inner and outer layers 70 and 72, separates a majority of the seventh leg 112 and the eighth leg 116. The eighth leg 116 delivers lubricating fluid 32 to a third or left side surface shroud output port 120 disposed near the bottom corner of the front surface 20 and the left side surface 24 of the transmission housing 12.

As briefly described above, the third output port 120 connects to the fan shroud input port 62 to deliver lubricating fluid 32 to the output passage 64 of the fan shroud left half 49. The output passage 64 then directs the lubricating fluid 32 to the shroud output port 68 connected to the housing input port 38 to return the fluid 32 to the internal chamber 30 of the transmission housing 12.

Like the fan shroud 42, the housing shroud 60 may connect to the transmission housing 12, the fan shroud 42, or both in various manners. For example, the housing shroud 60 may be welded to the fan shroud 42. However and as shown in the figures, the housing shroud 60 preferably connects to the housing 12 via fasteners 52, some of which also connect the fan shroud 42 to the housing 12. In this case, spacers of the fasteners 52 separate the panels 76, 92, and 106 from the housing walls 18 to form the gap 75 there between.

In operation, the lubricating fluid 32 flows out of the internal chamber 30 of the transmission housing 12 through the housing output port 36 and into the input passage 56 of the fan shroud right half 47. The lubricating fluid 32 then flows through the serpentine section of the cooling passageway formed by the housing shroud panels 76, 92, and 106. The housing shroud 60 delivers the lubricating fluid 32 to the output passage 64 of the fan shroud left half 49. The lubricating fluid 32 then flows back into the internal chamber 30 of the housing 12 through the housing input port 38. Of course, the fan 27 simultaneously exhausts air into the air gap 75 to cool the housing walls 18 and the lubricating fluid 32 flowing through the cooling passageway provided by the cooling shroud 40.

The structure of the cooling shroud 40 may vary from the above description without departing from the scope of the invention. For example, the housing shroud 60 may provide a flow path for the lubricating fluid 32 having a different shape than the serpentine flow path described above. Nevertheless, such a housing shroud 60 preferably has a relatively large surface area over which the lubricating fluid 32 dissipates heat.

As another example, the weld lines 98 and 118 and the shroud openings 88, 102, and 114 may be shorter than those as shown and described. However, these features preferably extend over the majority of the length between the front and rear surface 20 and 26 to provide a relatively large surface area for relatively high heat transfer with the air gap 75.

As yet another example, right and left halves 47 and 49 of the fan shroud 42 may be formed from common inner and outer layers 44 and 46. In this case, the input passage 56 and the output passage 64 of the fan shroud 42 may be separated by an internal wall, e.g., a weld line 66 connecting the inner and outer layers 44 and 46.

Figure 8:
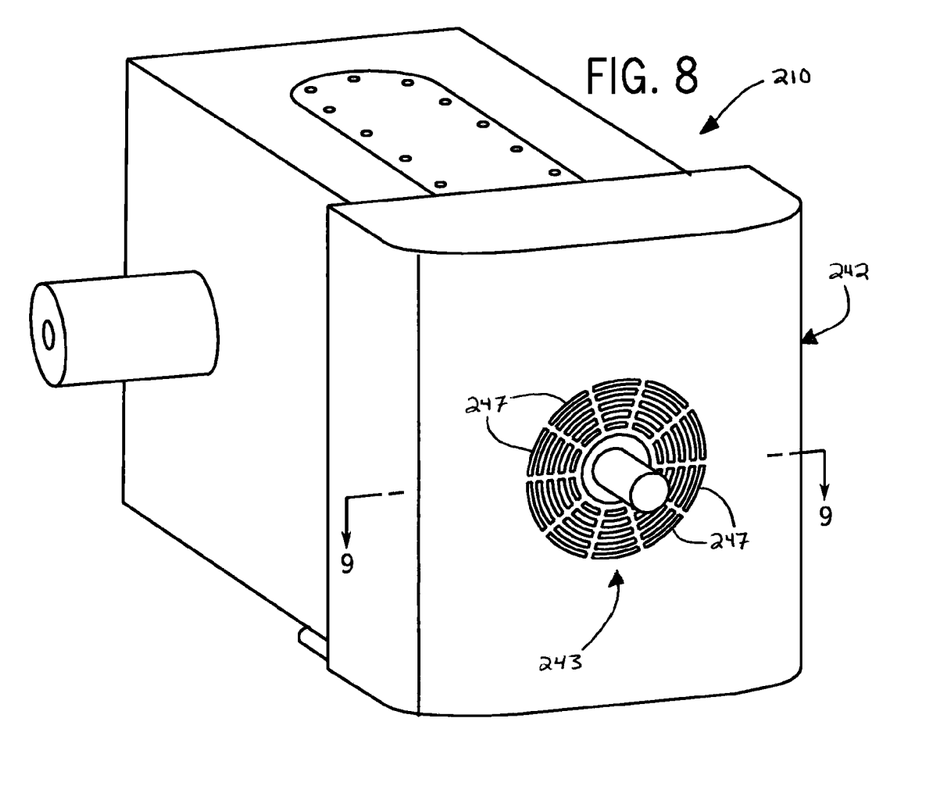
FIG. 8 is a perspective view of a second embodiment of a transmission including a fan shroud according to the present invention.
Figure 9:
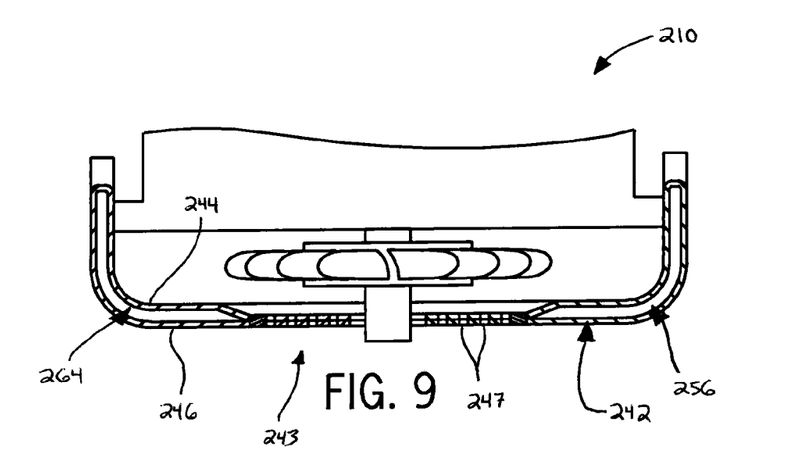
FIG. 9 is a top sectional view of the fan shroud along line 9-9 of FIG. 8.

As yet another example and referring now to FIGS. 8 and 9, a second embodiment of a transmission 210 according to the present invention includes a fan shroud 242 having a general U-shape as viewed from above. Like the fan shroud 42 described above, the fan shroud 242 includes an inner layer 244 and an outer layer 246 (e.g., shaped sections of sheet metal) that define fluid cooling passageways 256 and 264 there between. However, the fan input 243 includes a plurality of small input slits 247 through which air enters the fan shroud 242.

Figure 10:
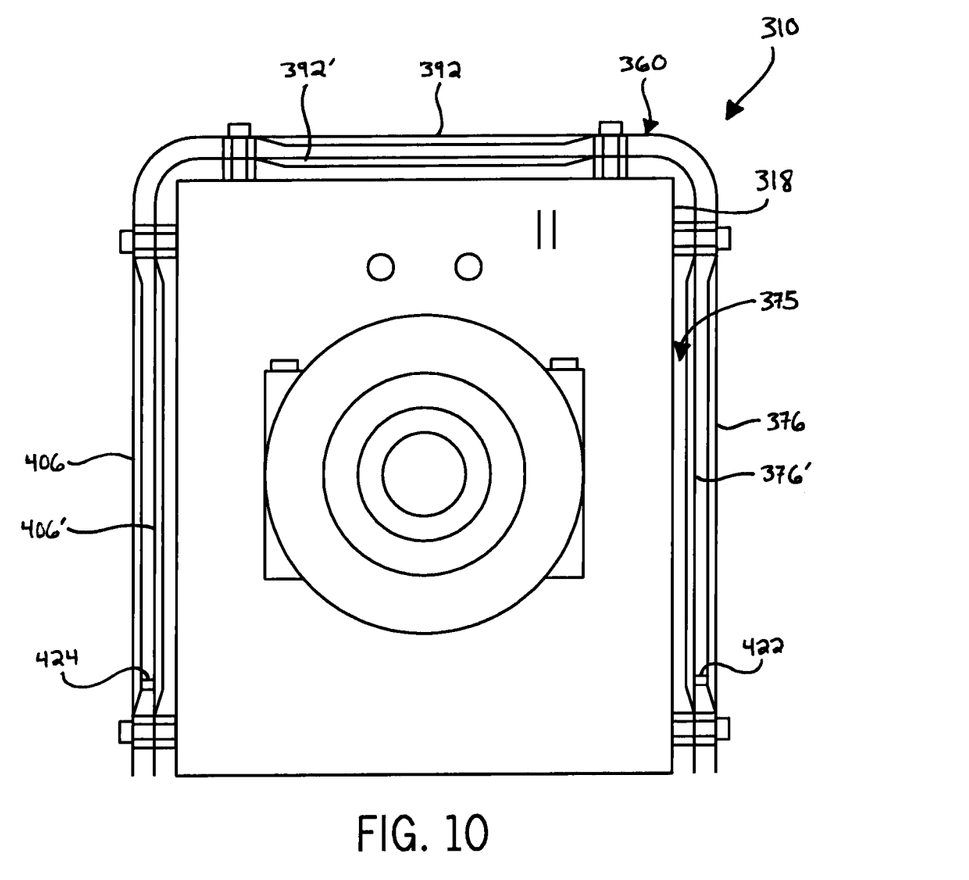
FIG. 10 is a front view of a third embodiment of a transmission according to the present invention with the fan and the fan shroud removed.
Figure 11:
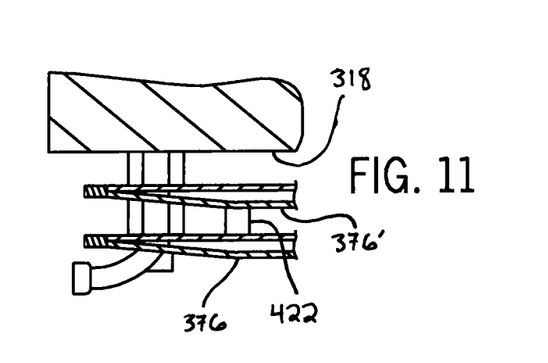
FIG. 11 is a detail section view of the transmission of FIG. 10.

As yet another example and referring now to FIGS. 10 and 11, a third embodiment of a transmission 310 according to the present invention includes a housing shroud 360 having additional panels to further dissipate heat from the transmission 310. That is, the housing shroud 360 includes panels 376, 392, and 406 as described above as well as inner panels 376', 392', and 406' disposed in the air gap 375 adjacent the transmission housing walls 318. The inner panels 376', 392', and 406'may provide the same general saddle shape as the outer panels 376, 392, and 406 as described above. As such, the inner panels 376', 392', and 406' may nearly double the amount of lubricating fluid 32 within the housing shroud 360 at a given time. Furthermore, the inner panels 376', 392', and 406' include inlet and outlet ports 422 and 424 that receive and deliver lubricating fluid 32, respectively, such that the inner panels 376', 392', and 406' provide a second serpentine cooling path. Alternatively, the inner panels 376', 392', and 406' may include multiple ports at various locations that provide a greater amount of fluid exchange between the inner panels 376', 392', and 406' and the outer panels 376, 392, and 406. In any case, air exhausted by the fan cools lubricating fluid 32 in both the inner panels 376', 392', and 406' and the outer panels 376, 392, and 406.

Exemplary embodiments of the invention have been described in considerable detail. Many modifications and variations to the embodiments described will be apparent to a person of ordinary skill in the art. Therefore, the invention should not be limited to the embodiments described, but should be defined by the claims that follow.

We claim:

1. A transmission comprising:
   a housing having housing walls defining an internal chamber including an output port and an input port;
   a rotatable input shaft extending through one of said housing walls into said internal chamber;
   power transmission components disposed in said internal chamber and rotatably driven by said input shaft;
   an output shaft extending through one of said housing walls from said internal chamber and rotatably driven by said power transmission components;
   a lubricating fluid disposed in said internal chamber and lubricating said power transmission components;
   a cooling shroud surrounding said housing and defining a gap between at least one of said housing walls, said cooling shroud including a cooling passageway in fluid communication with said output port and said input port, wherein said lubricating fluid flows out of said internal chamber through said output port into said codling passageway, through said cooling passageway, and back into said internal chamber through said input port;
   a pump disposed in said internal chamber of said housing, said pump delivering said lubricating fluid through said output port and into said cooling passageway, through said cooling passageway, and back into said internal chamber through said input port; and
   a fan exhausting air through said gap cooling said at least one of said housing walls and said lubricating fluid flowing through said cooling passageway.

2. The transmission of claim 1, wherein said fan is supported by one of said input shaft and said output shaft, said fan exhausting air through said gap cooling said at least one of said housing walls and said lubricating fluid flowing through said cooling passageway as said one of said input shaft and said output shaft rotates.

3. The transmission of claim 1, wherein said cooling shroud includes a fan shroud surrounding said fan, said fan shroud partially defining said cooling passageway.

4. The transmission of claim 1, wherein said cooling shroud includes a housing shroud surrounding said housing, said housing shroud includes a first shroud panel partially defining said cooling passageway, a second shroud panel partially defining said cooling passageway and connected to said first shroud panel, and a third shroud panel partially defining said cooling passageway and connected to said second shroud panel opposite said first shroud panel, said housing being disposed between said first shroud panel and said third shroud panel.

5. The transmission of claim 4, wherein said first shroud panel, said second shroud panel, and said third shroud panel define a serpentine shape of said cooling passageway.

6. The transmission of claim 1, wherein said cooling shroud includes an inner sheet metal layer and an outer sheet metal layer defining said cooling passageway there between.

7. The transmission of claim 1, further comprising a plurality of fasteners securing said cooling shroud to said housing, each of said plurality of fasteners comprising a spacer disposed in said gap.

8. The transmission of claim 1, wherein said housing walls define opposing surfaces, and said cooling passageway includes a first leg directing lubricating fluid proximate one of said surfaces towards another of said surfaces.

9. The transmission of claim 8, wherein said cooling passageway includes a second leg in fluid communication with said first leg, said second leg directing lubricating fluid from said first leg towards said first surface.

10. The transmission of claim 8, wherein said input shaft extends from said first surface.

11. A transmission comprising:
    a housing having housing walls defining an internal chamber including an output port and an input port;
    a rotatable input shaft extending through one of said housing walls into said internal chamber;
    power transmission components disposed in said internal chamber and rotatably driven by said input shaft;
    an output shaft extending through one of said housing walls from said internal chamber and rotatably driven by said power transmission components;
    a lubricating fluid disposed in said internal chamber and lubricating said power transmission components;

a cooling shroud including a fan shroud and a housing shroud surrounding said housing, said housing shroud defining a gap between at least one of said housing walls, said housing shroud and said fan shroud together defining a serpentine cooling passageway in fluid communication with said output port and said input port, wherein said lubricating fluid flows out of said internal chamber through said output port into said cooling passageway, through said cooling passageway, and back into said internal chamber through said input port; and a fan disposed within said fan shroud, said fan exhausting air through said gap cooling said at least one of said housing walls and said lubricating fluid flowing through said cooling passageway.

12. The transmission of claim 11, wherein said housing shroud includes an inner sheet metal layer and an outer sheet metal layer partially defining said cooling passageway there between, at least some edges of said inner sheet metal layer and said outer sheet metal layer being sealed against each other.

13. The transmission of claim 12, wherein said at least some edges of said inner sheet metal layer and said outer sheet metal layer are sealed against each other by weld lines.

14. The transmission of claim 11, wherein said fan shroud includes an inner sheet metal layer and an outer sheet metal layer partially defining said cooling passageway there between.

15. The transmission of claim 11, wherein said housing shroud includes a first shroud panel partially defining said cooling passageway, a second shroud panel partially defining said cooling passageway and connected to said first shroud panel, and a third shroud panel partially defining said cooling passageway and connected to said second shroud panel opposite said first shroud panel, said housing being disposed between said first shroud panel and said third shroud panel.

16. The transmission of claim 15, wherein said first shroud panel includes a first shroud opening through which said output shaft extends.

* * * * *

UNITED STATES PATENT AND TRADEMARK OFFICE
CERTIFICATE OF CORRECTION

PATENT NO. : 9,599,406 B2
APPLICATION NO. : 12/694692
DATED : March 21, 2017
INVENTOR(S) : Adam L. Tietyen et al.

It is certified that error appears in the above-identified patent and that said Letters Patent is hereby corrected as shown below:

Claim 1, Column 8, Line 5: "codling" should be --cooling--

Signed and Sealed this
Thirteenth Day of June, 2017

Joseph Matal
*Performing the Functions and Duties of the
Under Secretary of Commerce for Intellectual Property and
Director of the United States Patent and Trademark Office*